United States Patent
Kirkman

(10) Patent No.: US 11,127,309 B2
(45) Date of Patent: Sep. 21, 2021

(54) FLIGHT MANAGEMENT SYSTEM OPERATOR

(75) Inventor: Robin Kirkman, Centreville, VA (US)

(73) Assignee: The MITRE Corporation, McLean, VA (US)

( * ) Notice: Subject to any disclaimer, the term of this patent is extended or adjusted under 35 U.S.C. 154(b) by 427 days.

(21) Appl. No.: 13/205,990

(22) Filed: Aug. 9, 2011

(65) Prior Publication Data

US 2013/0040269 A1    Feb. 14, 2013

(51) Int. Cl.
*G09B 9/08* (2006.01)

(52) U.S. Cl.
CPC ................... *G09B 9/08* (2013.01)

(58) Field of Classification Search
CPC ........................................ G09B 9/08
See application file for complete search history.

(56) References Cited

U.S. PATENT DOCUMENTS

| | | | |
|---|---|---|---|
| 6,564,241 B1 | 5/2003 | Rosengard | |
| 7,801,714 B2 | 9/2010 | Villey | |
| 8,493,240 B1* | 7/2013 | Carrico | G08G 5/0021 340/945 |
| 2008/0104609 A1* | 5/2008 | D'Amora et al. | 718/106 |
| 2010/0174475 A1* | 7/2010 | Estkowski | G01C 23/005 701/120 |
| 2012/0221305 A1* | 8/2012 | Srivastav | G08G 5/0013 703/6 |
| 2013/0261853 A1* | 10/2013 | Shue et al. | 701/3 |
| 2016/0247412 A1* | 8/2016 | Chen | G09B 9/301 |
| 2017/0039859 A1* | 2/2017 | Hu | G09B 9/08 |
| 2018/0012502 A1* | 1/2018 | Savarit | G08G 5/0034 |
| 2018/0108261 A1* | 4/2018 | Zajac | G08G 5/0039 |

OTHER PUBLICATIONS

Robert K. Heffley, Use of a Task-Pilot-Vehicle (TPV) Model as a Tool for Fight Simulator Math Model Development, AIAA Modeling and Simulation Technologies Conference, Aug. 2-5, 2010.*
Robert K. Heffley, Application of Task-Pilot-Vehicle (TPV) Models in Flight Simulation, AHS 66th Annual Forum, May 11-13, 2010.*
Michael Ricard, Stephan Kolitz, The ADEPT Framework for Intelligent Autonomy, Paper presented at the RTO AVT Course on "Intelligent Systems for Aeronautics", held in Rhode-Saint-Genèse, Belgium, May 13-17, 2002.*

(Continued)

*Primary Examiner* — Omar F Fernandez Rivas
*Assistant Examiner* — Robert S Brock
(74) *Attorney, Agent, or Firm* — Sterne, Kessler, Goldstein & Fox P.L.L.C.

(57) ABSTRACT

A method of performing a flight simulation is provided. The method includes retrieving a flight action; mapping the flight action to an instruction, the instruction being configured to bring about a desired state of a flight simulator; identifying a command based on the desired state of the flight simulator and a first state of the flight simulator; and determining if a second state of the flight simulator after executing the command matches the desired state of the flight simulator.

19 Claims, 6 Drawing Sheets

(56) References Cited

OTHER PUBLICATIONS

T. John Koo, Bruno Sinopoli, Alberto Sangiovanni-Vincentelli, Shankar Sastry, A Formal Approach to Reactive System Design: Unmanned Aerial Vehicle Flight Management System Design Example, In Proceedings of IEEE International Symposium on Computer-Aided Design, Kohala Coast, Hawaii, Aug. 1999.*
Ahmad, O.; Cremer, J.; Kearney, J.; Willemsen, P.; Hansen, S., "Hierarchical, concurrent state machines for behavior modeling and scenario control," AI, Simulation, and Planning in High Autonomy Systems, 1994. Distributed Interactive Simulation Environments., Proceedings of the Fifth Annual Conference on , vol. No., pp. 36,42, Dec. 7-9, 1994.*
Duane T. Davis, Design, Implementation and Testing of a Common Data Model Supporting Autonomous Vehicle Compatibility and Interoperability, Thesis, Naval Postgraduate School, Sep. 2006.*
Randolph M. Jones, John E. Laird, Paul E. Nielsen, Karen J. Coulter, Patrick Kenny, and Frank V. Koss, Automated Intelligent Pilots for Combat Flight Simulation, AI Magazine vol. 20 No. 1 (1999).*
Chunguang Wang, Jingfeng He, Guixian Li, Junwei Han, An Automated Test System for Flight Simulator Fidelity Evaluation, Journal of Computers, vol. 4, No. 11, Nov. 2009.*
Michel Marc Sadoune, Terminal Area Flight Path Generation Using Parallel Constraint Propagation, Massachusetts Institute of Technology, Flight Transportation Laboratory Report R 89-1, 1989.*
Myung Hwangbo; Kuffner, J.; Kanade, T "Efficient Two-phase 3D Motion Planning for Small Fixed-wing UAVs," Robotics and Automation, 2007 IEEE International Conference on , vol. No., pp. 1035,1041, Apr. 10-14, 2007.*
Alan Schaar, "Future Embedded Computer System Support Technologies (FEST)/ Automated Validation (AUTOVAL)—vol. 4—TESTMASTER™ Evaluation Report for the Automated Validation (AUTOVAL) Program", Avionics Directorate—Wright Laboratory—Air Force Materiel Command—Wright-Patterson Air Force Base OH, WL-TR-97-1112, (2004), 193 pages.*
Pisanich, G., Ippolito, C., Plice, L, Young, L and Lau, B., "Actions, Observations, and Decision-Making: Biologically Inspired Strategies for Autonomous Aerial Vehicles," AIAA Aerospace Sciences Meeting, Reno, NV, Jan. 2004, 15 pages.*
Andres Y. Agudelo-Toro, Carlos M. Velez, Transition Management for the Smooth Flight of a Small Autonomous Helicopter, J Intell Robot Syst (2010) 58:69-94.*
Ippolito, C., "An Autonomous Autopilot Control System Design for Small Scale UAVs," Tech. Rep., QSS Group—NASA Ames Research Center, Dec. 2006, 13 pages.*
Steven M. Lavalle, Planning Algorithms, Cambridge University Press, 2006, Chp 8, pp. 369-432, as archived on Jun. 14, 2010, retrieved from http://web.archive.org/web/20100614212042/http://planning.cs.uiuc.edu/bookbig.pdf.*
Andrew Bruce Curtis, Path Planning for Unmanned Air and Ground Vehicles in Urban Environments, Thesis, Department of Electrical and Computer Engineering, Brigham Young University, Apr. 2008, p. i-441.*
Steven M. Lavalle, Planning Algorithms, Cambridge University Press, 2006, Chps 8-10, pp. 369-558, as archived on Jun. 14, 2010, retrieved from http://web.archive.org/web/20100614212042/http://planning.cs.uiuc.edu/bookbig.pdf (Year: 2006).*
Virtanen, et al. "Decision theoretical approach to pilot simulation." Journal of Aircraft 36, No. 4 (1999): 632-641. (Year: 1999).*
Cavalli, Daniel. "Discrete-time pilot model.[human dynamics and digital simulation]." (1978). pp. 177-186 (Year: 1978).*
Burdun, Ivan, Dimitri Mavris, Ivan Burdun, and Dimitri Mavris. "A technique fortesting and evaluation of aircraft flight performance during early design phases." In 1997 World Aviation Congress, p. 5541. 1997 (Year: 1997).*
Burdun, I. Y. "An AI situational pilot model for real-time applications." In ICAS, Congress, 20 th, Naples, Italy, pp. 210-237. 1996 (Year: 1996).*
Cavalli, Daniel, and Dominique Soulatges. "Discrete time modelization of human pilot behavior", Eleventh Annual Conference on Manual Control, National Aeronautics and Space Administration, pp. 119-129, (1975) (Year: 1975).*
Cavalli, D. "Discrete time modeling of heavy transport plane pilot behavior.", Proceedings Thirteenth Annual Conference On Manual Control. pp. 321-228. (1977) (Year: 1977).*
Degani, Asaf, Michael Shafto, and Alex Kirlik. "Modes in automated cockpits: Problems, data analysis and a modelling framework." In Israel Annual Conference on Aerospace Sciences, pp. 258-266. Omanuth Press Ltd, 1996 (Year: 1996).*
Van Fleet, et al., *Automated Validation of Operational Flight Programs (OFPs) and Flight Training Simulators*, IEEE. CH3431, pp. 1006-1013 (1994).

* cited by examiner

FLIGHT MANAGEMENT SYSTEM OPERATOR

STATEMENT REGARDING FEDERALLY-SPONSORED RESEARCH AND DEVELOPMENT

Statement under M.P.E.P. § 310. The U.S. government has a paid-up license in this invention and the right in limited circumstances to require the patent owner to license others on reasonable terms as provided for by the terms of Contract DTFA01-01-C-00001 awarded by the Federal Aviation Administration (FAA).

Part of the work performed during development of this invention utilized U.S. Government funds. The U.S. Government has certain rights in this invention.

BACKGROUND

Field

The present invention generally relates to flight simulator control.

Background

Flight simulators allow for the simulation of actual flight in different environments. Complex simulators can include motion platforms that allow the cockpit to be moved in 6 degrees of freedom in response to pilot actions and/or environment conditions (e.g., turbulence or other weather conditions). Thus, flight simulators can be highly effective tools in training pilots generally and for specific aircraft.

Flight simulators can also be used to generate and collect test data for a particular aircraft, e.g., to study advanced capabilities of the aircraft being simulated. But to obtain an accurate understanding of an aircraft's capabilities, the aircraft's operation typically must be simulated in a variety of environments. Hence, multiple scenarios must often be simulated to obtain an accurate representation of the aircraft's capabilities. Because of the increasingly complex nature of aircraft simulators, each of the simulations often must be executed by an actual pilot. This can create a bottleneck for the study of aircraft capabilities because scheduling significant amounts of pilot time for simulation can be difficult and costly.

BRIEF SUMMARY

Embodiments described herein generally relate to performing flight simulations. For example, a method of performing a flight simulation is provided. The method includes retrieving a flight action, mapping the flight action to an instruction, the instruction being configured to bring about a desired state of a flight simulator, identifying a command based on the desired state of the flight simulator and a first state of the flight simulator, and determining if a second state of the flight simulator after executing the command matches the desired state of the flight simulator.

In another embodiment, a flight simulation system is provided. The flight simulation system includes a control library configured to store a plurality of commands; and a flight simulation controller. The flight simulation controller is configured to retrieve a flight action to be simulated, the flight action being configured to bring about a desired state of a flight simulator, map the flight action to an instruction, the instruction being configured to bring about a desired state of a flight simulator, identify an command from the control library based on the desired state of the flight simulator and a first state of the flight simulator, and determine if a second state of the flight simulator after executing the command matches the desired state of the flight simulator.

In still another embodiment, a non-transitory computer program product is provided. The non-transitory computer program product includes a computer usable medium having control logic embodied in the medium that, when executed by a computer, causes the computer to perform operations to perform a flight simulation, the operations including retrieving a flight action to be simulated, the flight action being configured to bring about a desired state of a flight simulator, identifying an command based on the desired state of the flight simulator and a first state of the flight simulator, and determining if a second state of the flight simulator after executing the command matches the desired state of the flight simulator.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
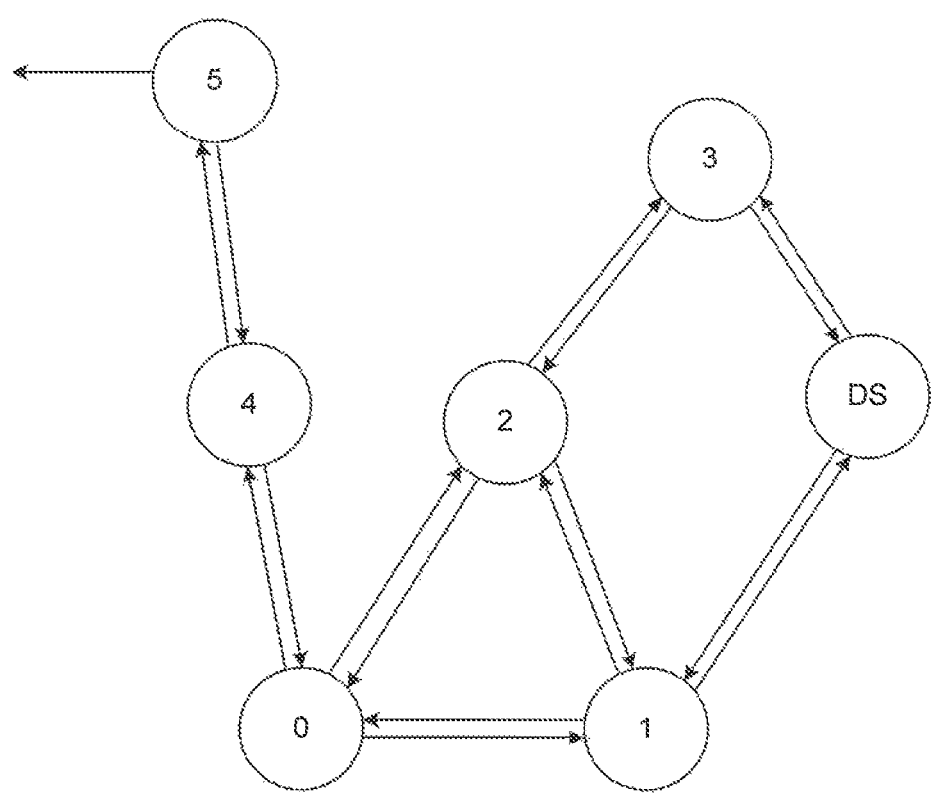
FIG. 1 shows a diagram showing an exemplary operation of graph theory, according to an embodiment of the present invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

Flight simulators (also referred to herein as "sFMS") are devices that allow for the simulation of varying degrees of actual flights. Advanced flight simulators include replicas of actual cockpits with all the controls that would be available to a pilot in an actual aircraft. These flight simulators can also include motion platforms that allow, for example, the cockpit to be moved in 6 degrees of freedom in response to pilot actions and/or environment conditions (e.g., turbulence or other weather conditions) (it is noted that the invention is not limited to the particular flight simulator examples mentioned herein, but is instead applicable to all flight simulators). As such, flight simulators can be highly effective tools in training pilots for flight generally and in training pilots for specific aircraft.

Moreover, flight simulators can also be used to generate and collect test data for a particular aircraft, e.g., to study advanced capabilities of the aircraft. For example, a flight simulator can be used to simulate how well an aircraft meets speed and altitude constraints, how well the aircraft performs in other categories when meeting speed and altitude constraints and when under time of arrival control, and how well the aircraft meets required time of arrivals and required lateral offsets. The values for each of these criteria depend not only on the aircraft itself, but also the environment in which the aircraft is flown. Thus, multiple scenarios must be simulated to obtain an accurate representation of the aircraft's capabilities. Because of the increasingly complex nature of flight simulators, each of the simulations often must be executed by an actual pilot. Thus, to collect a large sample size for a given aircraft may require a great amount of pilot time.

In embodiments described herein, the methods and systems of flight simulation are provided that mimic human interaction with a flight simulator so flight scenario(s) can be simulated without requiring actual pilot time. For example, in one embodiment, a flight management system (FMS) controller described herein can include a graph theory engine used to navigate a flight simulator from a current state to a desired state using commands that mimic human (e.g., pilot) interaction with the flight simulator. In doing so, the FMS controller executes instructions used to implement actions, which make up the scenario being simulated without pilot involvement.

FIG. 1 shows a diagram 100 that illustrates the operation of the graph theory in the context of flight simulation, according to an embodiment of the present invention. In diagram 100, the circles, or vertices, illustrate different states of a flight simulator and arrows between circles illustrate the effect of a specific command. For example, a command can result in a button of the flight simulator being pushed or a knob of the flight simulator being turned to a specific position. The state of the flight simulator can be determined by reading the flight simulator's screen. In an embodiment, graph theory can be applied to navigate from state 0 (i.e., the current state of the flight simulator) to state DS (i.e., the desired state of the flight simulator). As shown in exemplary embodiment of FIG. 1, there are three different commands that can be executed when the flight simulator is in state 0. The three different commands take the flight simulator to one of state 1, state 2, and state 4.

An FMS controller, which controls the issuance of commands to the flight simulator, can include a graph theory engine that determines the shortest path between state 0 and state DS. The FMS controller then can control a control library to issue the command that takes the flight simulator along the shortest path. In the example of FIG. 1, the graph theory engine can map out all of the paths based on the three different possible commands available at state 0 and select the path that reaches the desired state in the shortest number of steps. In the embodiment of FIG. 1, a shortest path from state 0 to state DS is from state 0 to state 1 and then from state 1 to the desired state. Thus, the FMS controller can issue the command that takes the flight simulator from state 0 to state 1. Once state 1 is reached, the FMS controller draws another graph based on the then-current state of the flight simulator. The FMS controller then repeats the step of determining the shortest path to state DS.

By redrawing the graph whenever a state is reached, the FMS controller ensures robustness in the face of unexpected results. For example, if the FMS controller controls the control library to issue the command that is to take the flight simulator from state 0 to state 1, but the command instead results in flight simulator being taken to step 2, the FMS controller can react accordingly. The graph theory engine can draw a new diagram that illustrates all the paths that can be taken from the then-current state to the desired state.

In an embodiment, the graph theory engine can be implemented using a variety of commonly known computer languages. For example, the graph theory engine can be implemented using object oriented programming languages, e.g., Java. In such an embodiment, a program can be written that calls a function to create a vertex at the current state and vertices at the different states from which the current state can be realized. Another function can be called that returns all the different paths, or "edges," and whether those paths take the flight simulator to the desired state, the command needed to take that path, and the number of steps needed to take that path to the desired state. If this function returns a number of different possibilities, the graph theory engine can choose the one that realizes the desired state in the least number of steps. Thus, the graph theory engine according to the embodiments described herein can be implemented using a shortest path algorithm with dynamically generated nodes.

Figure 2:
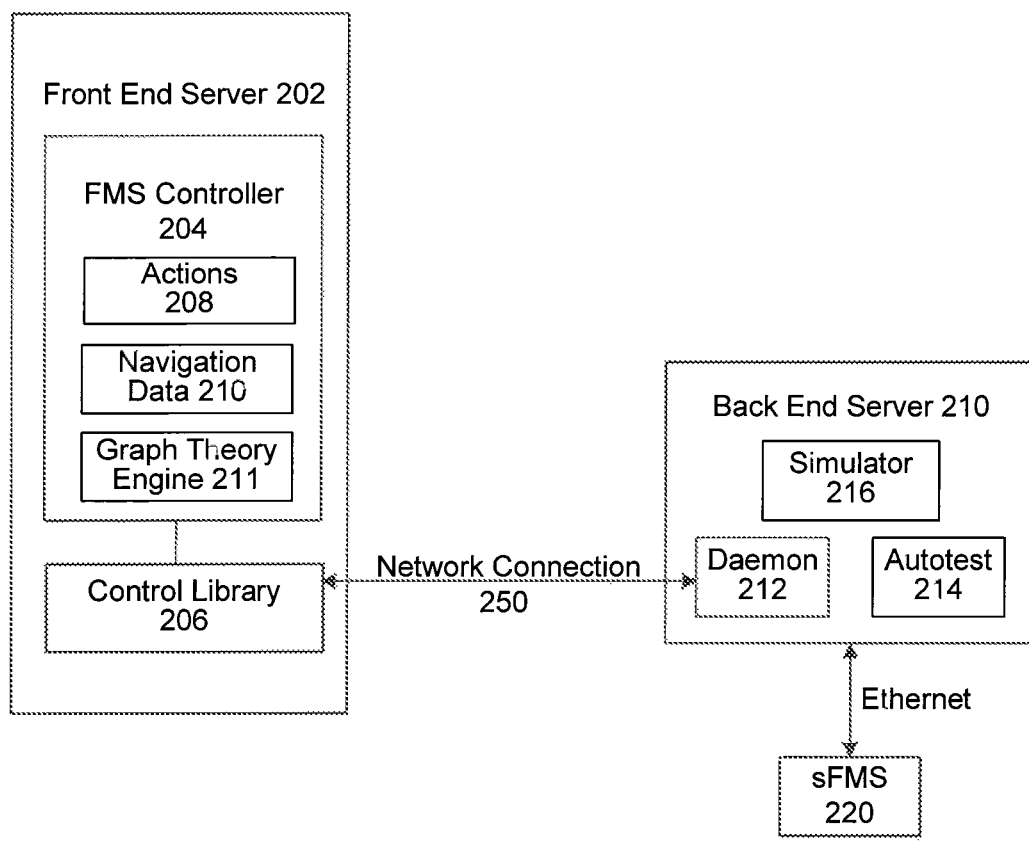
FIG. 2 shows a block diagram of a flight simulation system, according to an embodiment of the present invention.

FIG. 2 shows a block diagram of a flight simulation system 200, according to an embodiment of the present invention. A system 200 includes a front end server 202, a back end server 210, and an sFMS 220. sFMS 220 can be a hardware device that simulates the operation of an actual aircraft complete with a replica of what is found inside the cockpit of the aircraft and a motion platform the simulates responses to pilot actions and/or environmental conditions.

Front end server 202 includes an FMS controller 204 and a control library 206. FMS controller 204 includes an actions queue 208, a navigation data module 210, and a graph theory engine 211. Back end server 210 includes a Daemon module 212, Autotest module 214, and a simulator module 216. FMS controller 204, control library 206, Daemon module 212, Autotest module 214, and simulator module 216 can each be implemented in software, hardware, or a combination thereof. For example, FMS controller 204 can be implemented in software using object oriented programming languages known to those skilled in the relevant arts, e.g., Java.

FMS controller 204 controls the operation of sFMS 220 by issuing commands from control library 206. Actions queue 208 holds actions that implement a user-provided scenario. Navigation data module 210 issues specific instruction(s) that implement each of the actions in actions queue 208. Graph theory engine 211 is an event driven engine that navigates from a current the state of sFMS 220 to a desired state of sFMS 220.

Daemon module 212 is configured to facilitate communication between front end server 202 and back end server 210 over network connection 250. For example, Daemon module 212 can be implemented as a dynamic link library that exposes the API of back end server 210, monitors network connections for traffic from front end 202, and forwards commands to Autotest module 214. Autotest module 214 serves as a link to simulator module 216. For example, Autotest module 214 can be configured to facilitate the running of scripts on simulator module 216. Simulator module 216 can interact with sFMS 220 according to commands received from Autotest module 214. Moreover, simulator module 216 can be configured to "read" the screen of sFMS 220 to provide the current state of sFMS 220 or to turn a knob or a push a button of sFMS 220.

Front end server 202 is coupled to back end server 210 over a network connection 250. Network connection 250 can be implemented as the Internet or any other communication network known to those skilled in the relevant art. Back end server 210 is coupled to sFMS 220 using an Ethernet connection 260.

Figure 3:
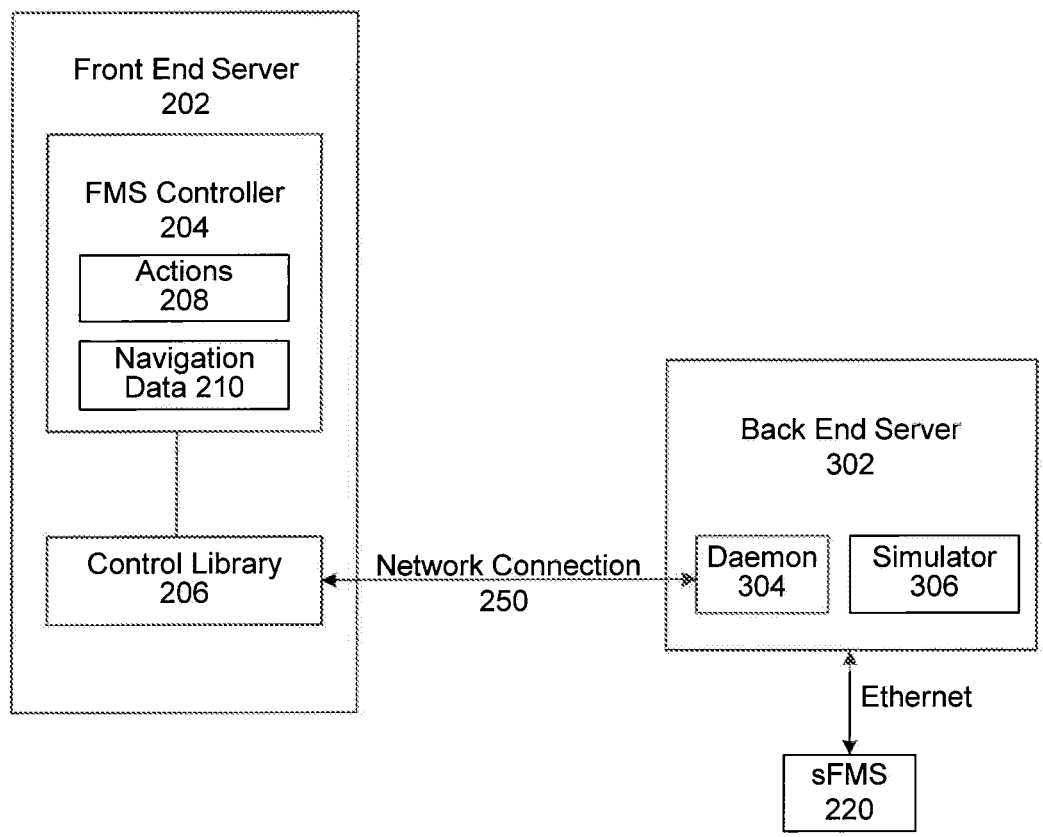
FIG. 3 shows a block diagram of a flight simulation system, according to another embodiment of the present invention.

In an embodiment, Autotest module 214 may only be available for some sFMSs. FIG. 3 shows a block diagram with a flight simulation system 300, according to an embodiment of the present invention. Flight simulation system 300 is substantially similar to flight simulation system 200 except that back end server 210 is replaced with back end server 302. As shown in FIG. 3, back end server 302 can be substantially similar to back end server 210 except that back end server 302 does not include Autotest module 214. Instead, Daemon module 304 can be configured to communicate directly with simulator module 306. In an embodiment, simulator module 306 is modified such that commands issued by control library 206 and received by Daemon module 304 can be received by simulator module 306. The operation of flight simulation systems 200 and 300 will be described in greater detail below.

Figure 4:
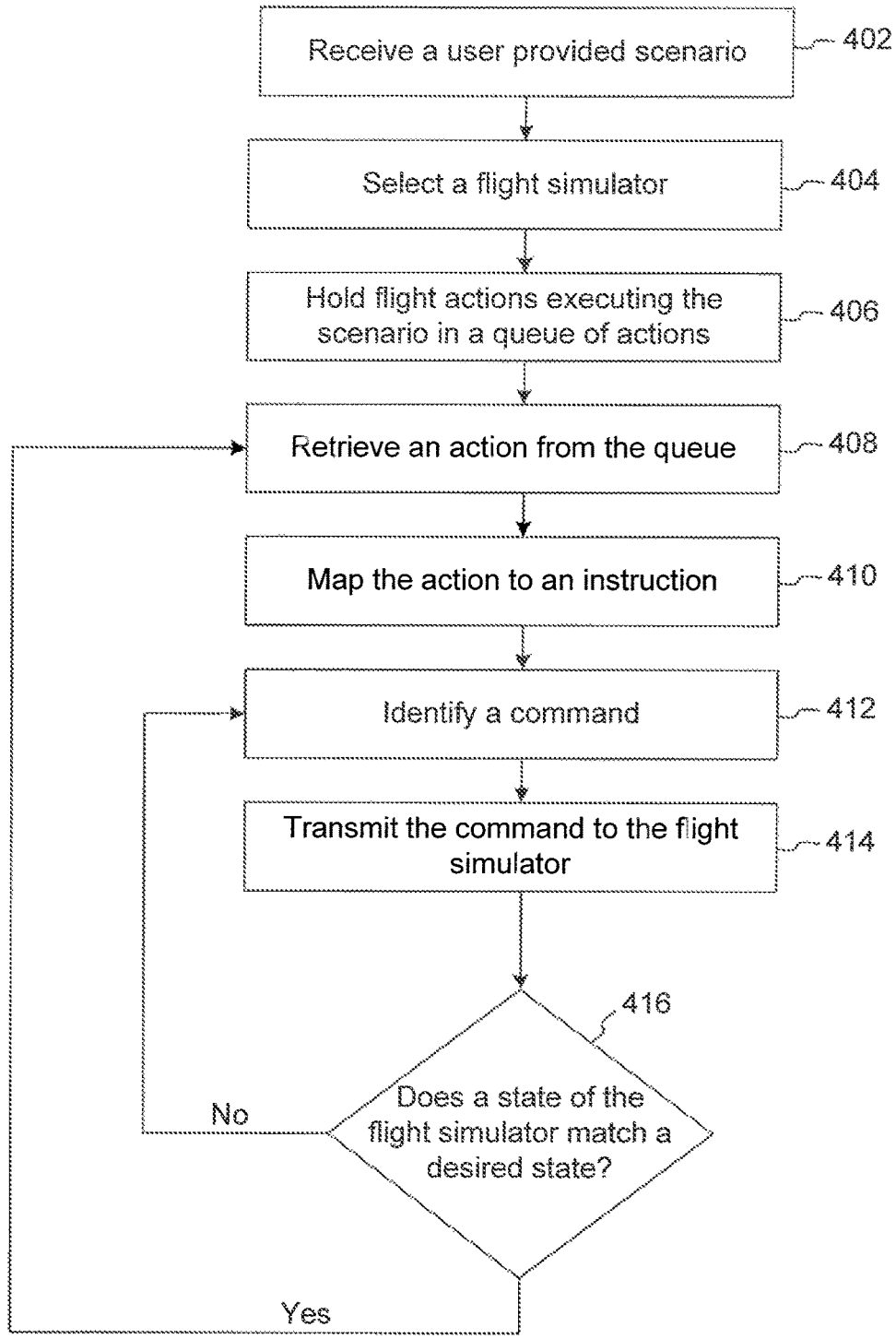
FIG. 4 shows a flowchart providing example steps for flight simulation, according to an embodiment of the present invention.

FIG. 4 shows a flowchart 400 providing example steps for performing a flight simulation, according to an embodiment of the present invention. Other structural and operational embodiments will be apparent to persons skilled in the relevant art(s) based on the following discussion. The steps shown in FIG. 4 do not necessarily have to occur in the order shown. The steps of FIG. 4 are described in detail below.

In step 402, a user-provided scenario is received. For example, in FIG. 2, a user can input a scenario into front end server 202. In another embodiment, a user can input multiple scenarios that are held in a buffer of front end server 202 (not shown) and those scenarios can be simulated sequentially or in parallel when front end server 202 is coupled to a number of different sFMSs. For example, the user provided scenario can be a flight from location A to location B in a given set of environmental conditions. In an embodiment, front end server 202 can provide a user interface implemented in software that facilitates user input of scenario(s) to be simulated.

In step 404, a flight simulator is selected. For example, front end server 202 can select back end server 210 based on the type of aircraft that its associated sFMS 220 simulates and a workload of back end server 210. For example, if front end server 202 is coupled to a plurality of back end servers that are each coupled to a respective sFMS, front end server 202 can select back end server 210 based on the aircraft which sFMS 220 simulates and the load of back end server 210.

In step 406, flight actions that make up the user-provided scenario are held in a queue of actions. For example, in FIG. 2, FMS controller 204 can use the user-provided scenario to generate a number of actions and hold those actions in action queue 208. For example, one of the actions may be going through a number of pre-flight flight checks prior to leaving from location A or taking off from a runway at location A, turning on or off of data recording, or setting environmental conditions.

In step 408, an action is retrieved from the queue. For example, in FIG. 2, FMS controller 204 can retrieve an action from actions queue 208. In an embodiment, FMS controller 204 can retrieve actions from actions queue 208 in a first end first out (FIFO) order. Thus, if the pre-flight check action was the first action loaded into actions queue 208, FMS controller 204 can retrieve that action first.

In step 410, the retrieved action is mapped to an instruction. For example, in FIG. 2, navigation data module 210 can map the retrieved action to implement an instruction. For example, in the embodiment in which the retrieved action is following a specific flight plan, navigation data module 210 can be configured to issue one or more specific instructions to give effect to that flight plan, e.g., navigation data module 210 can issue one or more instructions to insert a "leg" into the flight. Generally, as described herein, an instruction is a construct that is used to transition the state of a flight simulator from a current state to a desired state. Thus, in the example above, an instruction issued by navigation data module 210 can be used to bring about a specific state of sFMS 220. Moreover, as described herein, the state of sFMS 220 can be determined from the screen of sFMS 220, which can be retrieved using get parameter commands, described in greater detail below.

In step 412, a command is identified to implement the instruction. For example, as described below, in FIG. 2, graph theory engine 211 can be used to identify a command based on the current state of sFMS 220 and desired state associated with the instruction identified in step 410.

In an embodiment, commands come in two general types: set parameter commands and get parameter commands. Set parameter commands set a specific parameter in sFMS 220. For example, a set parameter command may be one that turns a knob in sFMS 220 from one position to another position or pushes a button of sFMS 220. A get parameter command can be one that reads characters on the screen of FMS 220 (e.g., obtaining a position of a knob and/or a status of a button). The information presented on the screen of sFMS 220 together forms the state of sFMS 220. In an embodiment, by mapping a user-provided scenario down to specific set parameter and get parameter commands, the operation of front end 202 is independent of a specific flight back end server or sFMS. In particular, set parameter and get parameter commands are configured such that they mimic actual human interaction with the flight simulator. In other words, set and get commands allow front end server 202 to control sFMS 220 as a human pilot would, thereby allowing front end server 202 to be versatile enough to interact with a variety of different sFMSs. The operation of step 412 will be described in greater detail below with reference to FIG. 5.

In step 414, the identified command is transmitted to the flight simulator. For example, in FIG. 2, the command is transmitted from the control library 206 to Daemon 212 using network connection 250. The command is then passed to simulator module 216, which executes the command on sFMS 220. Similarly, in the embodiment of FIG. 3, Daemon module 304 passes the command to simulator module 306, which executes the command on sFMS 220. For example, the simulator, e.g., simulator module 216 (in system 200) or simulator module 306 (in system 300), can turn a knob or push a button of sFMS 220 in response to a set command.

In step 416, it is determined whether a state of the flight simulator matches the desired state associated with the identified instruction. For example, in the embodiment in which the identified instruction is to insert a "leg" into the flight, it can be determined whether a transmitted command successfully redirected the aircraft. To determine the state of flight simulator after executing the transmitted command, FMS controller 204 can prompt control library 206 to obtain the state of sFMS 220. If the state of sFMS 220 matches the desired state, flowchart 400 can, for example, return to step 410 to retrieve another instruction, return to step 408 to retrieve another action, or return to step 402 to retrieve another user-provided scenario. As noted above, an action can be mapped to one or more instructions that implement the action. Thus, if the state of sFMS 220 matches the desired state associated with the instruction identified in step 410, FMS controller 204 can determine that the instruction has been completed using one or more previously executed commands and that another instruction can be executed. If, however, the instruction was the last instruction needed to implement the action (e.g., if the action retrieved in step 408 can be implemented using a single instruction or of the instruction identified in step 410 is the last of the instructions needed to implement the action), FMS controller 204 can move on to the next action held in actions queue 208. And if the action retrieved in step 408 is the last action in actions queue 208 (e.g., if the user-provided scenario received in step 402 is made up of a single action or if the action retrieved in step 408 is the final action that makes up the user-provided scenario), then FMS controller 204 can move on to another user-provided scenario in step 402 (if another has been provided by a user).

If the current state of sFMS 220 does not match the desired state, another command can be identified in step 412. Identifying another command if the desired state is not met is described in greater detail with reference to FIG. 5. Once another command is identified, FMS controller 204 can wait a period of time before transmitting that command to back end server 210 (e.g., in step 414). This delay ensures that commands do not get lost. That is, the delay ensures that commands are not received by a simulator (e.g., simulator 216 or simulator 306) when the state of sFMS 220 is undefined so that a command cannot be executed. In an embodiment, the delay can be 3 seconds.

Figure 5:
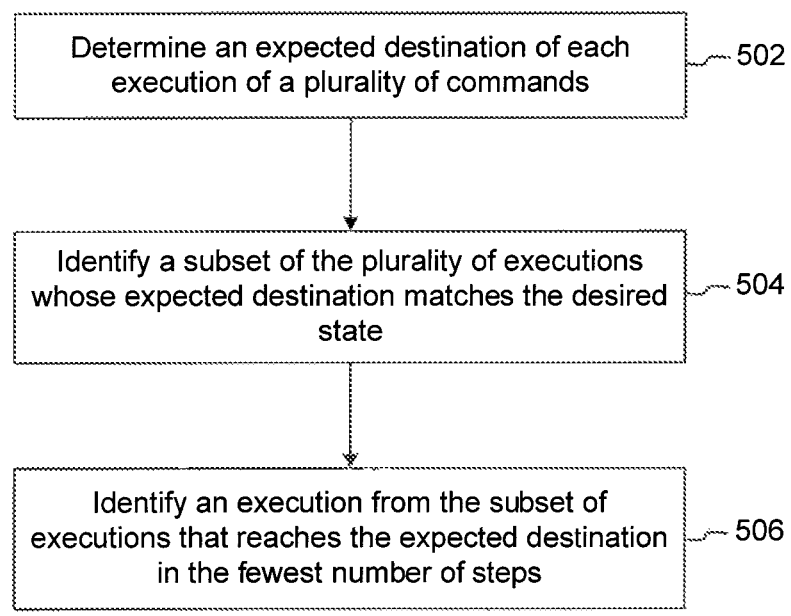
FIG. 5 shows a flowchart providing example steps for identifying a command, according to an embodiment of the present invention.

FIG. 5 shows a flowchart 500 implementing step 412 of flowchart 400, according to an embodiment of the present invention. Other structural and operational embodiments will be apparent to persons skilled in the relevant art(s) based on the following discussion. Flowchart 500 is described with reference to the exemplary embodiment of FIG. 1. As would be apparent to those skilled in the relevant arts, the steps of flowchart 500 are not limited to that embodiment. The steps shown in FIG. 5 do not necessarily have to occur in the order shown. The steps of FIG. 5 are described in detail below.

In step 502, paths associated with each command of a plurality of commands are determined. For example, in FIG. 2, graph theory engine 211 can map out a path for each command in control library 206 that is available at the current state of the sFMS 220. For example, graph theory engine 211 can determine all of the "edges" exiting from the current state of sFMS 211. For example, with reference to the exemplary embodiment of FIG. 1, graph theory engine 211 can map out the paths associated with each of the three commands available at state 0 (i.e., the three outward pointing arrows originating at state 0).

In step 504, a subset of the plurality of commands that have paths that pass through the desired state is identified. For example, in FIG. 2, graph theory engine 211 can identify the subset of available commands that have paths that pass through the desired state. For example, with reference to the exemplary embodiment of FIG. 1, graph theory engine 211 can identify the command that leads to state 1 and the command that leads to state 2 as having paths that pass through state DS.

In step 506, a command from the identified subset of commands that reaches the desired state in the fewest number of step is identified. For example, in FIG. 2, graph theory engine 211 can identify the command in the subset of commands identified in step 504 that reaches the desired state of the instruction in the fewest number of steps, e.g., by counting the steps included in each of the "edges" associated commands that result in sFMS 220 reaching the desired state. For example, with reference to the exemplary embodiment of FIG. 1, graph theory engine 211 can identify the command that leads to state 1 as reaching state DS in fewest number of steps (2 steps). Thus, the command that leads to state 1 is chosen as the command to issue.

In an embodiment, after the command is identified in step 412 of flowchart 400 (e.g., using the steps included in flowchart 500), the command is transmitted to the simulator module in step 414, and the simulator module executes the command on the sFMS. In step 416, it is determined whether the resulting state of the sFMS matches the desired state associated with the instruction. For example, with reference to the exemplary embodiment of FIG. 1, after transmitting the command that leads to state 1, FMS controller 204 can determine that state DS has not been reached. For example, FMS controller 204 can determine that state 1 has been reached. Or, in another embodiment, an unexpected condition may occur and some other state (not shown in FIG. 1) can instead be reached. At that point, flowchart 400 can return to step 412 to identify another command, e.g., using the steps of flowchart 500. Thus, until the desired state is reached, the steps of flowchart 500 can, for example, be called after every command is executed to dynamically draw a new graph (e.g., in step 502) and choose a command based on the graph (e.g., in steps 504 and 506). Thus, instead of generating a static script of commands, the steps of flowchart 500 can be used to effectively generate a graph dynamically so that the system can respond to unexpected changes in state (e.g., when the state resulting from a command is not included on the edge associated with the command).

Embodiments shown in FIGS. 2-5, or any part(s) or function(s) thereof, may be implemented using hardware, software modules, firmware, tangible computer readable media having instructions stored thereon, or a combination thereof and may be implemented in one or more computer systems or other processing systems.

Figure 6:
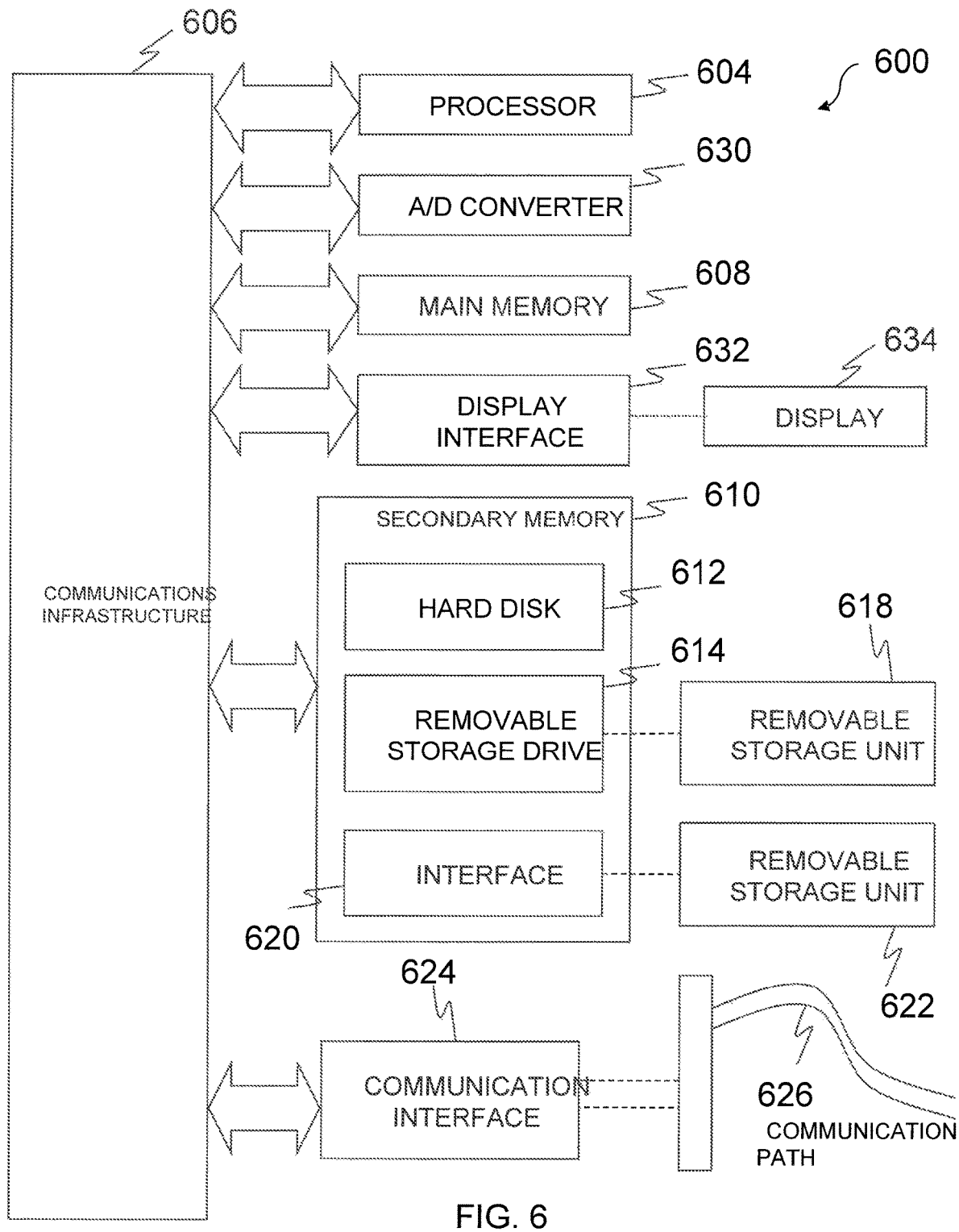
FIG. 6 is a block diagram schematically illustrating an example computer system in which embodiments described herein can be implemented.

FIG. 6 illustrates an example computer system 600 in which embodiments, or portions thereof, may be implemented as computer-readable code. For example, FMS controller 204, controller library 206, Daemon module 212, Autotest module 214, simulator module 216, Daemon module 304, simulator module 306 or portions thereof can be implemented in computer system 600 using hardware, software, firmware, tangible computer readable media having instructions stored thereon, or a combination thereof and may be implemented in one or more computer systems or other processing systems. Hardware, software, or any combination of such may embody any of the modules and components in FIG. 5.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments are described in terms of this example computer system 600. After reading this description, it will become apparent to a person skilled in the relevant art how to implement embodiments using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device. As will be appreciated by persons skilled in the relevant art, processor device 604 may also be a single processor in a multi-core/multiprocessor system, such system operating alone, or in a cluster of computing devices operating in a cluster or server farm. Processor device 604 is connected to a communication infrastructure 604, for example, a bus, message queue, network, or multi-core message-passing scheme.

Computer system 600 also includes a main memory 608, for example, random access memory (RAM), and may also include a secondary memory 610. Secondary memory 610 may include, for example, a hard disk drive 612, removable storage drive 614. Removable storage drive 614 may comprise a floppy disk drive, a magnetic tape drive, an optical disk drive, a flash memory, or the like. The removable storage drive 614 reads from and/or writes to a removable storage unit 618 in a well known manner. Removable storage unit 618 may comprise a floppy disk, magnetic tape, optical disk, etc. which is read by and written to by removable storage drive 614. As will be appreciated by persons skilled in the relevant art, removable storage unit 618 includes a computer usable storage medium having stored therein computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 can include a display interface 632 for interfacing a display unit 630 to computer system 600. Display unit 630 can be any device capable of displaying user interfaces according to this invention, and compatible with display interface 632. Examples of suitable displays include liquid crystal display panel based device, cathode ray tube (CRT) monitors, organic light-emitting diode (OLED) based displays, and touch panel displays. For example, computing system 500 can include a display 630 for displaying graphical user interface elements.

Computer system 600 may also include a communications interface 624. Communications interface 624 allows software and data to be transferred between computer system 600 and external devices. Communications interface 624 may include a modem, a network interface (such as an Ethernet card), a communications port, a PCMCIA slot and card, or the like. Software and data transferred via communications interface 624 may be in the form of signals, which may be electronic, electromagnetic, optical, or other signals capable of being received by communications interface 624. These signals may be provided to communications interface 624 via a communications path 626. Communications path 626 carries signals and may be implemented using, wire or cable, fiber optics, a phone line, a cellular phone link, a radio-frequency (RF) link or other communications channels.

Auxiliary I/O device interface 634 represents general and customized interfaces that allow processor device 604 to send and/or receive data from other devices 636, such as microphones, touch-sensitive displays, transducer card readers, tape readers, voice or handwriting recognizers, biometrics readers, cameras, portable mass storage devices, and other computers. Device interface 634 may perform signal conditioning and processing functions such as analog to digital and digital to analog conversion, amplification and filtering of device generated signals, and generation of hand-shaking signals to coordination the operation of devices 636 with the operations of computer system 600. For example, computing system 500 can include a touch screen device for capturing user manipulation of graphical user interface elements.

In this document, the terms "computer program medium" and "computer readable medium" are used to generally refer to storage media such as removable storage unit 618, removable storage unit 622, and a hard disk installed in hard disk drive 612. Computer program medium and computer usable medium may also refer to memories, such as main memory 608 and secondary memory 610, which may be memory semiconductors (e.g. DRAMs, etc.).

Computer programs (also called computer control logic) are stored in main memory 608 and/or secondary memory 610. Computer programs may also be received via communications interface 624. Such computer programs, when executed, enable computer system 600 to implement embodiments as discussed herein. In particular, the computer programs, when executed, enable processor device 604 to implement the processes of embodiments, such as the stages of the methods illustrated by flowchart 300 Accordingly, such computer programs can be used to implement controllers of the computer system 600. Where embodiments are implemented using software, the software may be stored in a computer program product and loaded into computer system 600 using removable storage drive 614, interface 620, and hard disk drive 612, or communications interface 624.

Embodiments also may be directed to computer program products comprising software stored on any computer readable medium. Such software, when executed in one or more data processing devices, causes a data processing device(s) to operate as described herein. For example, the software can cause data processing devices to carry out the steps of flowchart 300 FIG. 3.

Embodiments employ any computer useable or readable medium. Examples of tangible, computer readable media include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.). Other computer readable media include communication mediums (e.g., wired and wireless communications networks, local area networks, wide area networks, intranets, etc.).

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method of performing a flight simulation via a flight simulator, comprising:
    retrieving a flight action to be simulated within the flight simulation;
    mapping the flight action to an instruction to be executed by a graph engine of the flight simulator, wherein the instruction is configured to bring about a desired state of the flight simulator;
    generating, via the graph engine, a first node graph including a node corresponding to a current state of the flight simulator and a node corresponding to a second state of the flight simulator;
    identifying a first command for the flight simulator based on a path in the first node graph between the node corresponding to a current state of the flight simulator and the node corresponding to the second state of the flight simulator, wherein an execution of the first command is intended to cause a transition to the second state of the flight simulator and stimulate a first pilot action within a cockpit;
    simulating a flight condition having an effect on the first command;
    executing, via the flight simulator, the first command in view of the simulated condition;
    determining that the flight simulator entered a third state after executing the first command in view of the simulated condition, wherein the first node graph excludes a node corresponding to the third state;
    determining the third state is different than the desired state of the flight simulator;
    in response to the flight simulator entering the third state after executing the first command in view of the simulated condition, generating, via the graph engine, a second node graph based on the third state of the flight simulator and the desired state of the flight simulator, wherein the second node graph includes a node corresponding to the third state of the flight simulator and a node corresponding to a fourth state of the flight simulator;
    identifying a second command for the flight simulator based on a path in the second node graph between the node corresponding to the third state of the flight simulator and the node corresponding to the fourth state of the flight simulator, wherein an execution of the second command is intended to cause a transition to the fourth state of the flight simulator and stimulate a second pilot action within a cockpit; and
    executing the second command via the flight simulator based on identifying the second command.

2. The method of claim 1, wherein the first command is a set parameter command or a get parameter command.

3. The method of claim 1, wherein the identifying the first command further comprises:
    determining that the path in the first node graph reaches a node in the first node graph that corresponds to the desired state of the flight simulator.

4. The method of claim 3, wherein the identifying the first command further comprises:
    determining that the path in the first node graph that reaches the node corresponding to the desired state of the flight simulator from the node corresponding to the current state of the flight simulator is a shortest path in the first node graph that reaches the node corresponding to the desired state of the flight simulator from the node corresponding to the current state of the flight simulator.

5. The method of claim 1, further comprising:
    selecting the flight simulator from a plurality of flight simulators based on a workload of the flight simulator.

6. The method of claim 1, wherein the determining that the flight simulator entered the third state after executing the first command further comprises:
    transmitting a get parameter command to the flight simulator.

7. The method of claim 1, wherein the retrieving comprises retrieving the flight action from a buffer configured to hold a plurality of flight actions, and the method further comprises:
    receiving a user-provided scenario, wherein the plurality of flight actions are configured to simulate the user-provided scenario.

8. The method of claim 1, wherein the mapping comprises:
    mapping the flight action to a plurality of instructions configured to implement the flight action based on the flight action and the current state of the flight simulator.

9. The method of claim 1, wherein the first command simulates a human pilot turning a knob of the flight simulator.

10. The method of claim 1, wherein the first command simulates a human pilot pushing a button of the flight simulator.

11. The method of claim 1, wherein the first node graph is a directed graph.

12. A flight simulation system, comprising:
    a control library configured to store a plurality of commands; and a flight simulation controller configured to:
  determine a flight action to be simulated, wherein the flight action is configured to bring about a desired state of a flight simulator;
  map the flight action to an instruction to be executed by a graph engine of the flight simulator, wherein the instruction is configured to bring about the desired state of the the flight simulator;
  generate, via the graph engine, a first node graph including a node corresponding to a current state of the flight simulator and a node corresponding to a second state of the flight simulator;
  identify a first command for the flight simulator based on a path in the first node graph between the node corresponding to a current state of the flight simulator and the node corresponding to the second state of the flight simulator, wherein an execution of the first command is intended to cause a transition to the second state of the flight simulator and stimulate a first pilot action within a cockpit;
  simulate a flight condition having an effect on the first command;
  execute, via the flight simulator, the first command in view of the simulated condition;
  determine that the flight simulator entered a third state after executing the first command in view of the simulated condition, wherein the first node graph excludes a node corresponding to the third state;
  determine that the third state is different than the desired state of the flight simulator;
  in response to the flight simulator entering the third state after executing the first command in view of the simulated condition, generate, via the graph engine, a second node graph based on the third state of the flight simulator and the desired state of the flight simulator, wherein the second node graph includes a node corresponding to the third state of the flight simulator and a node corresponding to a fourth state of the flight simulator;
  identify a second command for the flight simulator based on a path in the second node graph between the node corresponding to the third state of the flight simulator and the node corresponding to the fourth state of the flight simulator, wherein an execution of the second command is intended to cause a transition to the fourth state of the flight simulator and stimulate a second pilot action within a cockpit; and
  execute the second command via the flight simulator based on identifying the second command.

13. The flight simulation system of claim 12, wherein the flight simulation controller is coupled to the flight simulator through a network connection.

14. A non-transitory computer program product comprising a computer usable medium having control logic embodied in the medium that, when executed by a computer, causes the computer to perform operations to perform a flight simulation, the operations comprising:
  determining a flight action to be simulated, wherein the flight action is configured to bring about a desired state of a flight simulator;
  generating, via the graph engine, a first node graph including a node corresponding to a current state of the flight simulator and a node corresponding to a second state of the flight simulator;
  identifying a first command based on a path in the first node graph between the node corresponding to a current state of the flight simulator and the node corresponding to the second state of the flight simulator, wherein an execution of the first command is intended to cause a transition to the second state of the flight simulator and stimulate a first pilot action within a cockpit;
  simulating a flight condition having an effect on the first command;
  executing, via the flight simulator, the first command in view of the simulated condition;
  determining that the flight simulator entered a third state after executing the first command in view of the simulated condition, wherein the first node graph excludes a node corresponding to the third state;
  determining the third state is different than the desired state of the flight simulator;
  in response to the flight simulator entering the third state after executing the first command in view of the simulated condition, generating, via the graph engine a second node graph based on the third state of the flight simulator and the desired state of the flight simulator, wherein the second node graph includes a node corresponding to the third state of the flight simulator and a node corresponding to a fourth state of the flight simulator;
  identifying a second command for the flight simulator based on a path in the second node graph between the node corresponding to the third state of the flight simulator and the node corresponding to the fourth state of the flight simulator, wherein an execution of the second command is intended to cause a transition to the fourth state of the flight simulator and stimulate a second pilot action within a cockpit; and
  executing the second command via the flight simulator based on identifying the second command.

15. The computer program product of claim 14, the operations further comprising:
  selecting the flight simulator from a plurality of flight simulators based on a workload of the flight simulator.

16. The computer program product of claim 14, wherein the identifying the first command further comprises:
  determining that the path in the first node graph reaches a node in the first node graph that corresponds to the desired state of the flight simulator.

17. The computer program product of claim 16, wherein the identifying the first command further comprises:
  determining the path in the first node graph that reaches the node corresponding to the desired state of the flight simulator from the node corresponding to the current state of the flight simulator is a shortest path in the first node graph that reaches the node corresponding to the desired state of the flight simulator from the node corresponding to the current state of the flight simulator.

18. The computer program product of claim 14, wherein the determining further comprises:
  transmitting a get parameter command to the flight simulator.

19. The computer program product of claim 14, the operations further comprising:
  retrieving the flight action from a buffer configured to hold a plurality of flight actions; and
  determining a plurality of paths in the second node graph from the node corresponding to the third state of the flight simulator in response to the flight simulator entering the third state.

* * * * *